United States Patent
Wurangian

[19]

[11] Patent Number: 5,836,569
[45] Date of Patent: Nov. 17, 1998

[54] GUIDED GATE VALVE

[75] Inventor: David A. Wurangian, Granada Hills, Calif.

[73] Assignee: Flowserve Management Company, Irving, Tex.

[21] Appl. No.: 908,904

[22] Filed: Aug. 8, 1997

Related U.S. Application Data

[62] Division of Ser. No. 420,231, Apr. 11, 1995, Pat. No. 5,704,594.

[51] Int. Cl.⁶ ........................................... F16K 3/18
[52] U.S. Cl. ............................. 251/327; 251/326
[58] Field of Search .................... 251/195, 326, 251/327

[56] References Cited

U.S. PATENT DOCUMENTS

| | | |
|---|---|---|
| 751,735 | 2/1904 | Jacobsen . |
| 2,230,600 | 2/1941 | Olson . |
| 2,660,191 | 11/1953 | Volpin . |
| 2,954,044 | 9/1960 | Volpin . |
| 2,974,677 | 3/1961 | Natho . |
| 3,123,090 | 3/1964 | Bredtschneider . |
| 3,259,358 | 7/1966 | Tripoli . |
| 3,305,208 | 2/1967 | Bredtschneider . |
| 3,348,567 | 10/1967 | Volpin . |
| 3,478,771 | 11/1969 | Johnson . |
| 3,905,576 | 9/1975 | Fox . |
| 4,081,175 | 3/1978 | Hasbrouck . |
| 4,114,469 | 9/1978 | Stratienko . |
| 4,463,930 | 8/1984 | Vamvakas . |
| 4,573,660 | 3/1986 | Husted . |
| 4,629,160 | 12/1986 | David . |

FOREIGN PATENT DOCUMENTS

| | | |
|---|---|---|
| 1175511 | 8/1964 | Germany . |
| 903341 | 8/1962 | United Kingdom . |

*Primary Examiner*—John Fox
*Attorney, Agent, or Firm*—Pretty, Schroeder & Poplawski

[57] ABSTRACT

A guided gate valve having a valve body with an interior surface defining a passage having an upstream opening an downstream opening. Upstream and downstream valve seats are mounted within the passage. A guide rail is mounted to the valve body between the valve seats to guide a pair of gates between an open position and a closed position.

19 Claims, 4 Drawing Sheets

GUIDED GATE VALVE

This application is a division of application Ser. No. 08/420,231 filed Apr. 11, 1995 which application is now U.S. Pat. No. 5,704,593.

BACKGROUND OF THE INVENTION

In general, this invention relates to gate valves used to control the flow of a fluid, gas or the like. More particularly, this invention relates to gate valves for use in nuclear power plants or other industrial applications.

In industry, and in particular, the nuclear power industry, gate valves are widely used to control the flow of fluid and gas within various piping systems. As the name implies, a typical gate valve has a hollow valve body containing a gate that is movable between open and closed positions to selectively allow flow through the valve body. As used in power applications, especially nuclear power applications where safety is a paramount concern, gate valves should be reliable and function properly time after time. However, such valves must often function in environments with harsh operating conditions, including high temperatures and high pressures. These conditions can cause a gate valve to jam in a partially open position, resulting in safety concerns and, at the very least, costly repair. Accordingly, the failure of a gate valve operating under such conditions is a serious matter sought to be avoided.

As shown in FIG. 1A, one conventional gate valve 10 that has been used in the harsh operating conditions present in nuclear power applications has a wedge-shaped gate 12 having two faces 14. The narrow bottom portion of the wedge is formed by edges 16 and 18 of the gate and the wide top portion of the wedge is formed by edges 20 and 22 of the gate. The gate is connected to the free end of a valve stem 24. A motor drive mechanism or operator (not shown) engages the other end of the valve stem to move it and the gate vertically within an interior chamber 26 formed by a valve body 28.

The valve body 28 has an upstream opening 30, a downstream opening 32, and a passage 34 therebetween. Each gate face 14 engages an associated aligned valve seat 36 and 38 having a central opening 40 aligned with the passage. Because the gate faces are inclined to form the wedge-shape, the valve seats are also inclined to accept the gate faces. Each valve seat has a hardened, smooth face 42 around its central opening. When the wedge-shaped gate moves downward into a closed position, the gate faces meet their respective valve seats and block the central openings to prevent flow through the passage 34. Most importantly, until the gate moves into contact with the valve seats, the gate is carried by the valve stem 24, which is the only structure providing for the stability of the gate during its downward stroke.

While the conventional wedge-shaped gate valve 10 discussed above is generally effective in controlling a fluid or gas flow, it may fail to close or jam under the aforementioned harsh operating conditions. In particular, as shown in FIG. 1B, a strong flow moving in the direction of arrow A can actually result in a longitudinal load sufficient to bend the valve stem 24 and deflect the gate 12 in a downstream direction as it moves toward the closed position. This is sometimes referred to as disk tilting. When disk tilting occurs, the downstream gate face 14 is misaligned with its respective valve seat 38. As the downstream gate face 14 moves toward the closed position while under such misalignment, its lower edge can actually pass into the central opening 40 of the downstream valve seat 38. If the gate continues its downward movement, the gate face can jam into the valve seat's central opening. When such a jam occurs, frictional forces between the valve seat and the gate may increase to the point where the valve operator cannot generate a force sufficient to free the misaligned gate from the valve seat, thereby causing a loss of control of the flow through the valve. Such valve failure gives rise to serious safety concerns and costly repair or replacement may also be required.

Another conventional gate valve has a valve body having a fluid passageway therethrough and a central chamber encasing a closure member. A valve stem extends downwardly from an upper end of the chamber. The lower end of the valve stem is threadedly attached to the closure member, which holds oppositely disposed upstream and downstream disks. Longitudinally spaced guides are mounted within the chamber. Each guide is located in approximate alignment with an associated valve seat. The guides are held in place between the valve body and flanges on the valve seats. Upon rotation of the stem, the closure member travels vertically on the stem between the guides to position the disks to open or close the passageway. One disadvantage of this gate valve is related to the guides, which are separate components that must be precisely aligned with their associated valve seats, rendering this valve difficult to manufacture. Further, if a guide becomes loose or misaligned during use, one disk could become subject to disk tilting and jam into its seat, rendering the valve incapable of closing. Also, because the upstream disk is not longitudinally supported on its downstream side, a bending force from a strong flow can be directly applied to the valve stem, which could result in unwanted disk tilt.

Accordingly, there is a definite need for a more reliable gate valve that resists disk tilting while operating under high temperature and pressure conditions. The present invention meets this need.

SUMMARY OF THE INVENTION

The present invention is embodied in a more reliable gate valve that resists disk tilting while operating under high temperature and pressure conditions. Accordingly, the gate valve of the present invention provides for precisely guided gate movement and is more reliable, thereby advantageously resulting in increased safety and lower maintenance costs.

The present invention relates to a gate valve that includes a valve body having an interior chamber with a passage having an upstream opening and a downstream opening. An upstream valve seat is mounted to the valve body and defines an upstream opening within the passage. A downstream valve seat is mounted to the valve body and defines a downstream opening within the passage. At least one guide rail is mounted to the interior surface of the valve body between the upstream valve seat and the downstream valve seat.

A first gate and a second gate are movably mounted within the interior chamber of the valve body so that each gate moves between an open position, wherein fluid communicates between the upstream opening and the downstream opening, and a closed position wherein the opening of one of the valve seats is blocked to prevent fluid communication between the upstream opening and the downstream opening. The first gate is located longitudinally between the upstream valve seat and the guide rail and is always guided by one of the upstream valve seat and the guide rail as it moves between the open and closed positions. The second gate is located longitudinally between the guide rail and the downstream valve seat and is similarly always guided by one of the downstream valve seat and the guide rail as the second gate moves between the open and closed positions.

An important advantage of the gate valve of this invention is associated with its ability to resist disk tilting while operating under high temperature and pressure conditions. Unlike a conventional gate valve, the gates of the invention are less likely to tilt longitudinally and jam into their valve seats because the alignment of the gates with their valve seats is always maintained while the gates move across a flow toward a closed position. Also, as a result of such alignment being maintained, no load is transmitted to the valve stem that would cause disk tilting. Further, in a more detailed aspect of the invention, a T-shaped guide rail can restrain gate movement in a plane parallel to that of the valve seats to advantageously eliminate any potential interference between the gates and the valve body.

In a more detailed aspect of the invention, the gate valve includes a valve stem, a spring, and a tubular bushing located between the gates. The spring is sized to fit within the tubular bushing to bias to bias the gates away from each other to maintain a seal under vibration or other severe conditions. The stem defines a hole to accept the bushing therein. Because the stem is not directly fixed to the gates, the gates are 'free floating' and do not subject the stem to any bending moments that could cause disk tilt. In particular, because each gate is supported by either the guide rail or the valve seat, no force is applied to the valve stem by a strong flow. Therefore, bending of the valve stem and disk tilt is advantageously avoided.

In yet another more detailed aspect of the invention, the gate valve includes a relief canal formed in the gate adjacent to the upstream valve seat. The relief canal extends through the gate to allow fluid communication between the upstream opening of the valve body and the interior chamber of the valve. The relief canal thus advantageously prevents dangerous pressure build up in the interior chamber of the valve which could jam the gates against their valve seats and prevent the valve from opening.

In yet another more detailed aspect of the invention, the gate valve includes a stem extension, a sliding bar, and a hollow yoke. The stem extension defines its own longitudinal axis, has a first end mounted to the first end of the valve stem, and has a second end for engaging a valve operator. The sliding bar has at least two arms extending radially outwardly from a center portion that is mounted to the stem extension. The hollow yoke is mounted on the valve body to house the stem extension and has at least two slots having a predetermined length aligned with the axis of the stem extension. The slots are sized to allow the sliding bar arms to move therein a predetermined distance parallel to the stem extension axis while restraining the rotation of the sliding bar and stem extension. The anti-rotation action of the sliding bar and yoke advantageously restrains the rotation of the stem extension to limit its movement to that along its own axis. Accordingly, this arrangement allows the stem extension to transform torsional load from threaded engagement with an operator into axial movement of the stem extension to move the attached stem and gates between the open and closed positions. In another more detailed feature, a dampening washer is mounted between the sliding bar and the stem extension to advantageously cushion the stem extension when the sliding bar reaches the limits of its travel.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings.

DESCRIPTION OF THE PREFERRED EMBODIMENT

Figure 4:
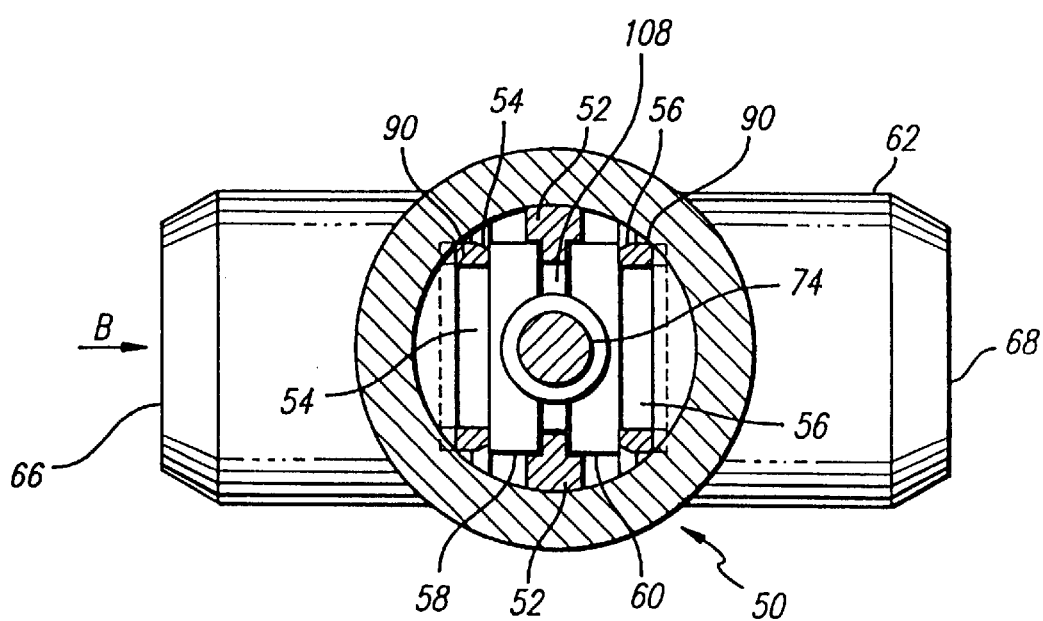
FIG. 4 is a cross-sectional view of the guided parallel gate valve, taken along lines 4—4 in FIG. 2.

As shown in the exemplary drawings, and particularly FIG. 4, the present invention is embodied in a guided parallel disk gate valve, generally referred to by the reference number 50, having two opposed guide rails 52 and two valve seats 54 and 56 for guiding two parallel disk gates 58 and 60 during their movement between an open position and a closed position, thereby preventing disk tilt and reducing the likelihood that one of the gates will jam into its associated seat and cause the valve to fail.

Figure 2:
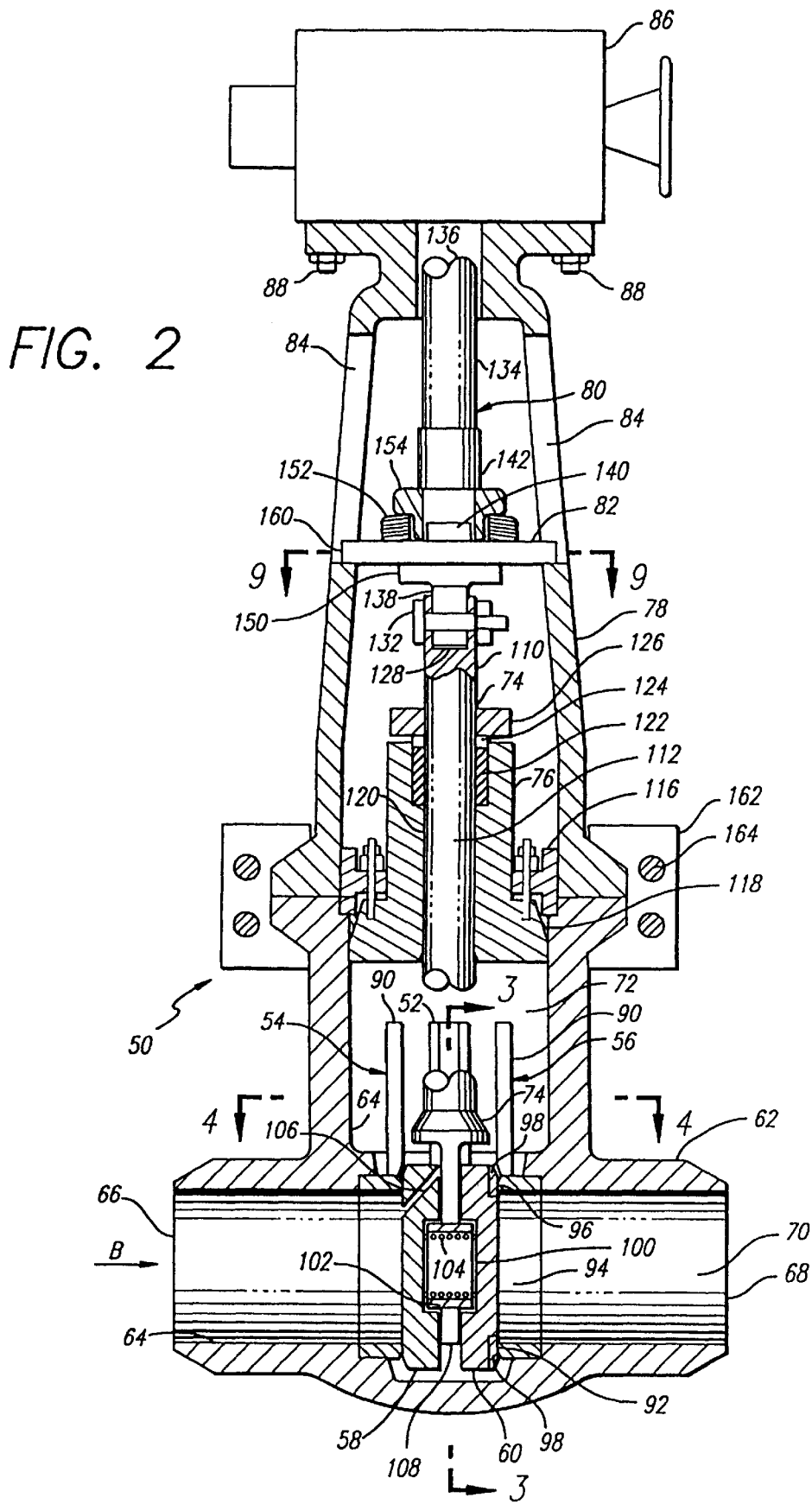
FIG. 2 is a side view, in partial cross-section of a guided parallel gate valve according to the present invention, shown in a closed position.

As shown in FIG. 2, the preferred gate valve 50 includes a valve body 62 having an internal surface 64, upstream opening 66, a downstream opening 68, and a generally horizontal internal passage 70 therebetween for accepting a flow of fluid indicated by arrow B. The valve body's internal surface also defines a vertically oriented internal chamber 72 that intersects the internal passage approximately midway between the upstream and downstream openings. The vertical chamber provides room for the upstream and downstream gates 58 and 60, the upstream and downstream valve seats 54 and 56, a stem 74, and the guide rails 52. The top of the valve body's vertical chamber is sealed by a bonnet 76. A tubular yoke 78 is mounted on top of the valve body to house a stem extension 80 and an associated sliding bar 82 that rides within vertical slots 84 in the yoke to prevent the stem extension from rotating when it is under a torsional load. A drive mechanism 86, known as an operator, is mounted to the top of the yoke by bolts 88. The operator can be of any type well known in the art, including an electric motor and associated gears or a manual handle.

Figure 1A:
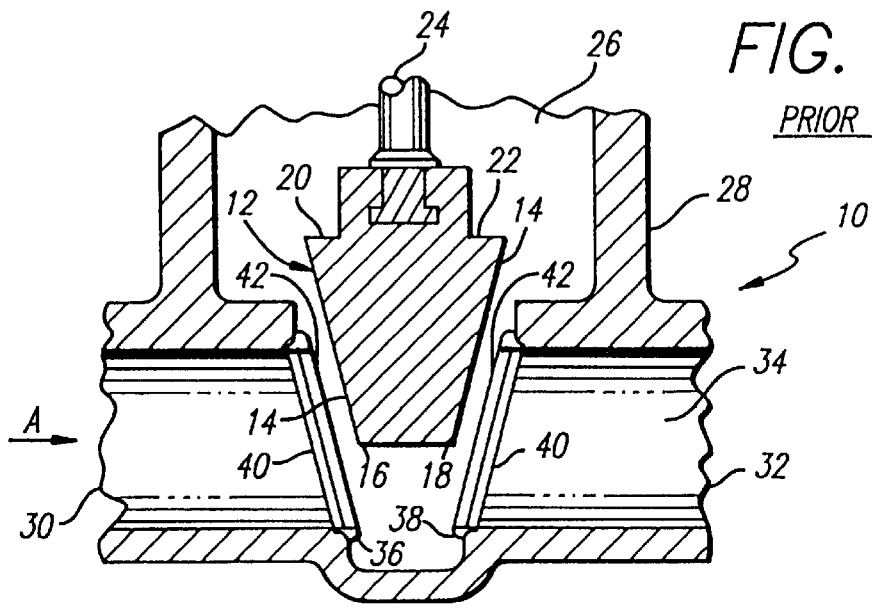
FIG. 1A is a cross-sectional side view of a gate valve according to the prior art.
Figure 1B:
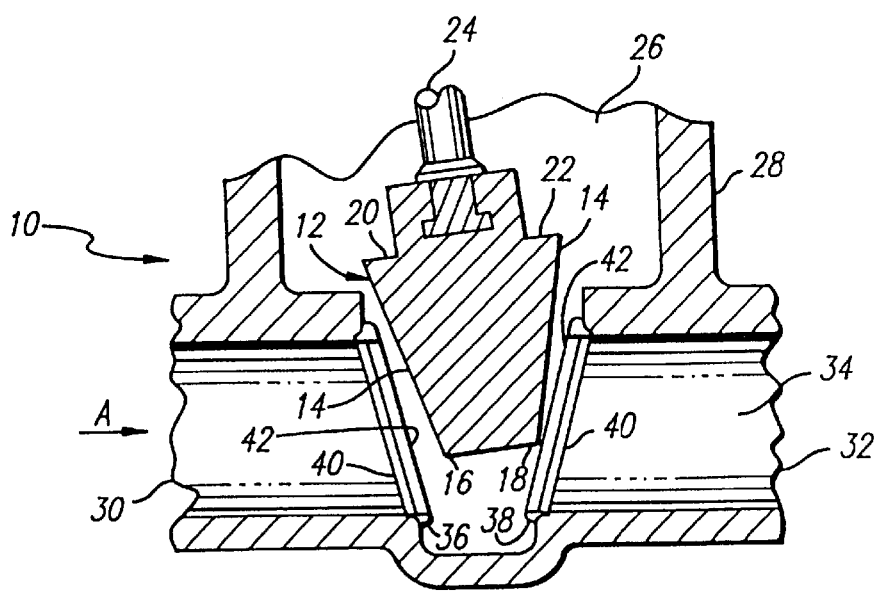
FIG. 1B is a cross sectional side view of the prior art gate valve from FIG. 1, showing a misalignment condition between the downstream gate and the downstream valve seat.
Figure 3:
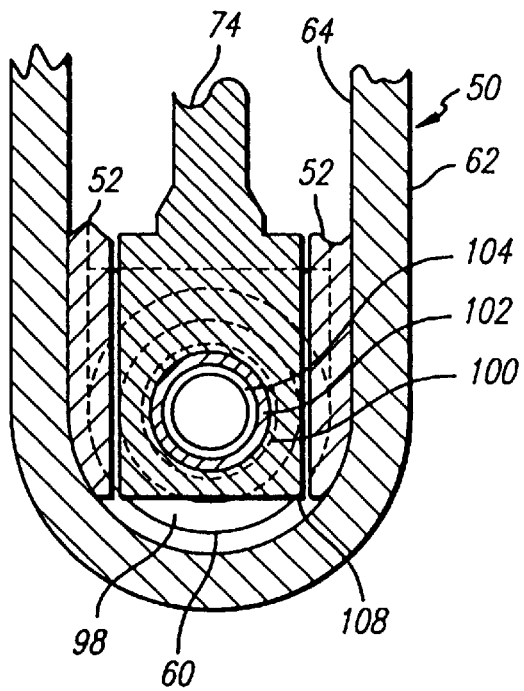
FIG. 3 is a cross-sectional view of the guided parallel gate valve, taken along lines 3—3 from FIG. 2.

Turning now to a detailed description of the valve body 62 and the parts therein, the vertical chamber 72 within the valve body is sized to allow the gates 58 and 60 to move a vertical distance sufficient to withdraw the gates from the horizontal passage 70 of the valve, as shown in FIGS. 1, 3, and 4. The guide rails 52 and valve seats 54 and 56 are also mounted inside the valve body and extend vertically from the vertical chamber to the horizontal passage. As its name implies, the upstream valve seat 54 is mounted upstream of the guide rails to provide a longitudinal space therebetween for guiding the movement of the upstream gate 58 as it slides down between the guide rails and the upstream valve seat. Similarly, the downstream valve seat 56 is mounted downstream of the guide rails to provide a similar longitudinal space for guiding the movement of the downstream gate 60 as it slides down between the guide rails and the downstream valve seat. The longitudinal clearance between the guide rails, valve seats and their associated gates is preferably limited to allow an angular gate movement of no more than two degrees. The guide rails and valve seats are mounted to the internal surface 64 of the valve body by means of welding or any other suitable process. Unless noted otherwise, the components of the guided gate valve 50 can be made from any material of suitable high strength, including high strength stainless steel, such as 17-4 Ph stainless steel.

Figure 7:
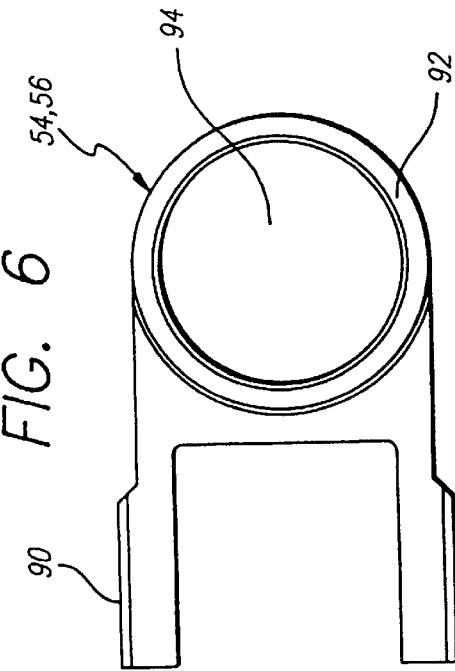
FIG. 7 is a front view of a valve seat from the guided parallel gate valve of FIG. 2.

With reference to FIGS. 2 and 7, the downstream valve seat 54 has two flat arms 90 and a circular face 92 defining a circular central opening 94 that is aligned with the internal passage 70 of the valve body 62. The circular face of the valve seat is hardfaced according to practices well known in the art. Such hardfacing can be accomplished by depositing Stellite Number 6 or other suitable material on the valve seat. This hardfacing of the valve seat face provides a hard and durable surface that will resist wear from contact with the gates 58 and 60. Both the face and the arms extending upward from the valve seat act as a guides during movement of the gates. Because the arms and the valve seat face are one unitary piece, assembly and maintenance problems arising from any misalignment between the arms and face are eliminated. The upstream valve seat 56 is the same as the downstream valve seat.

Figure 5:
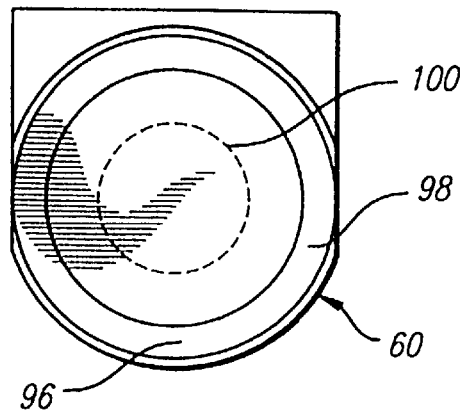
FIG. 5 is a front view of a gate from the guided parallel gate valve of FIG. 2.

As shown in FIGS. 2 and 5, the downstream gate 60 has a circular sealing surface 96 having a deposit of hardfaced material 98. While the sealing surface 96 of the upstream gate 58 is not shown as having a hardface material, the upstream gate can have such material on its sealing surface as well. Each gate is mounted so that its sealing surface opposes the face 92 of its associated valve seat 54 and 56. The other side of each gate has a cylindrical cup-like depression 100 that is sized to accept a retainer ring 102 and a spring 104 that are mounted horizontally between the cup-like depressions 100 in the gates 58 and 60. In the closed position, the retainer ring and the spring provide stability by biasing the gates toward their associated valve seats and maintaining a seal during severe vibration, such as that caused by an earthquake. Preferably, the spring provides a force of approximately five to ten times the weight of each disk, although other springs can be used as required by a specific application. As shown in FIG. 1, the upstream gate 54 has a small relief channel 106 that prevents any excess pressure build up in the vertical chamber 72 of the valve body 62 by allowing fluid communication between the vertical chamber and the upstream side of the passage 70. The retaining ring provides a free floating relationship between the gates and the valve stem 74 to prevent disk tilt by eliminating torsional loading on the valve stem.

With reference to FIGS. 2, 3, 4, and 6, the valve stem 74 has a rectangular flat lower plate 108, a cup-shaped upper end 110 and a cylindrical body 112 extending therebetween. The lower plate of the valve stem fits longitudinally between the gates 58 and 60 and has a circular hole 114 sized to receive the retaining ring 102 and spring 104 held between the parallel gates. Because the retaining ring passes through the hole in the lower plate of the valve stem and extends into the cup-like depressions 100 on each gate, the vertical movement of the valve stem causes the gates to move vertically as well. The body of the valve stem passes through the bonnet 76 so that the upper end of the valve stem projects outside the valve body 62. It should be noted that FIG. 3 does not show any structure behind the gate 60 for the sake of clarity.

The bonnet 76 is bolted to a flange 116 that is mounted around the top of the valve body 62. Graphite packing 118 located between the flange and the bonnet seals the vertical chamber 72 of the valve body. The bonnet has a central vertical hole 120 for receiving the valve stem 74 and sized to allow it to move vertically therein during the operation of valve 50. Packing 122 and a gland ring 124 are held beneath a gland 126 that is located around the top of the bonnet's central hole. The gland is connected to the bonnet by two bolts (not shown). The gland, gland ring, and packing provide a seal between the bonnet and the valve stem, as is well known in the art. The packing can be made of soft rubber, graphite or any other suitable material. The upper end 110 of the stem has a cup-like depression 128 and a hole 130 sized to accept a shoulder bolt 132 for connecting the valve stem to the stem extension 80.

Figure 8:
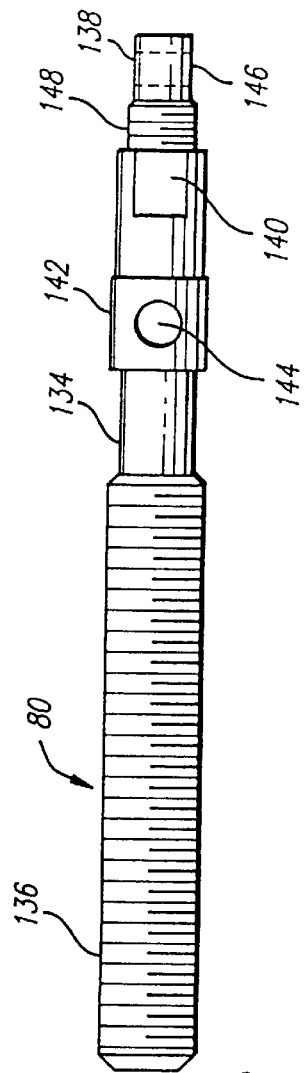
FIG. 8 is a front view of a valve stem extension from the guided parallel gate valve of FIG. 2.

As shown in FIGS. 2 and 8, the stem extension 80 has a generally cylindrical body 134, an upper threaded end 136, a lower end 138 located below a generally rectangular section 140, and an enlarged mid-section 142 having a throughhole 144. The threaded upper end of the stem extension projects into the operator 86 for threaded engagement therewith. The lower end of the stem is smooth and cylindrical and sized to fit into the cup-like depression 128 in the upper end 110 of the valve stem 74. The lower end of the stem extension has a throughhole 146 sized to accept the shoulder bolt 132 holding the stem extension to the valve stem. External threads 148 are located immediately above the lower end of the stem extension to engage a threaded nut 150 that holds the sliding bar 82, spring washers 152, and a bushing 154 up against the enlarged mid-section of the stem extension.

Figure 9:
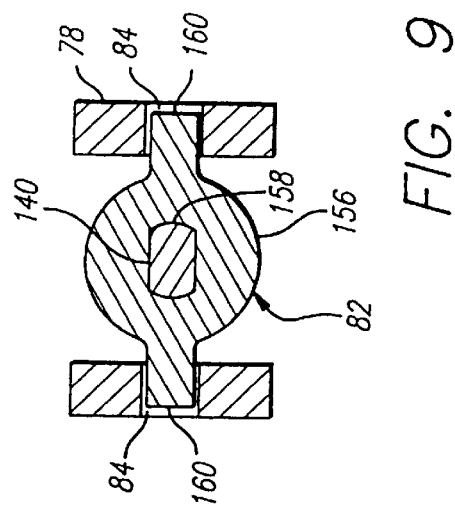
FIG. 9 is a cross-sectional view of a sliding bar from the guided parallel gate valve, taken along lines 9—9 from FIG. 2.
Figure 6:
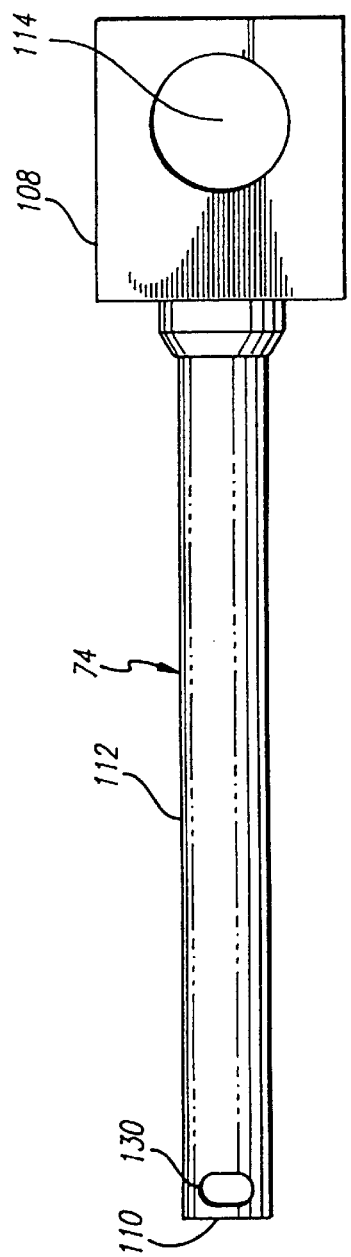
FIG. 6 is a side view of the valve stem from the guided parallel gate valve of FIG. 2.

As shown in FIGS. 2 and 9, the sliding bar 82 has a mid section 156 with a generally rectangular hole 158 adapted to fit onto the rectangular section 140 of the stem extension 80 to prevent the rotation of the stem extension with respect to the sliding bar. The sliding bar has two horizontal arms 160 that each extend radially outwardly into an associated one of two opposed vertical slots 84 formed in the yoke 78. These vertical slots only permit the sliding bar to move vertically without rotating. Because the sliding bar cannot rotate, the stem extension also cannot rotate and can only move vertically in response to its threaded engagement with the operator 86. This vertical movement causes the valve stem 74 and gates 58 and 60 to move between their open and closed positions. The height of the vertical slots also limits the vertical distance which the stem extension can travel during the operation of the valve 50. The spring washers provide a cushion between the sliding bar and the stem extension to dampen the movement of the stem extension when the sliding bar hits the bottoms of the slots in the yoke. During operation of the valve, if the spring washers become flat or compressed, then the operator may be producing too much force. A pair of semi circular brackets 162 hold the yoke to the valve body 62. These brackets are held together by bolts 164. The throughhole 144 in the enlarged midsection of the stem extension allows assembly personnel to place a bar therein to serve as an anti-rotation device to allow a proper torque to be applied to the nut 150.

Now the operation of the guided parallel gate valve 50 will be described. Starting from an open position wherein the gates 58 and 60 are completely within the vertical chamber 72 of the valve body 62 and thus do not obstruct the internal passage 70 of the valve body, the gates are moved downward by the action of the operator 86, which pushes the stem extension 80 downward by threaded engagement with its upper end 136. Note that, because the sliding bar 82 and the yoke 78 prevent the stem extension from rotating, this threaded engagement by the operator only moves the stem extension vertically. As the stem extension moves downward, the connected valve stem 74 moves downward as well. The lower end 108 of the valve stem pushes the retaining ring 102 and the parallel gates 58 and 60 downward into the passage. Because of the free floating connection to the gates provided by the retaining ring, the valve stem is not subject to torsional loading and bears a simple axial load. As each gate descends, it cannot move in a longitudinal direction to become misaligned because it slides between the guide rails 52 and the arms 90 of its associated valve seat 54 or 56. Furthermore, as each gate 58 and 60 moves even farther downward, the face of its associated valve seat 54 and 56 also holds the gate between it and the guide rails until the gate reaches the closed position and fully blocks the passage, as shown in FIG. 2. As a result of the guide rails and the valve seats guiding the gates, a strong flow is not likely to cause disk tilt, i.e. a misalignment of the downstream gate 60 with the downstream valve seat 56. Furthermore, because the gates only move linearly within the plane parallel to the valve seats, any potential interference with the valve body which could be caused by other directional movements is also eliminated. Accordingly, disk tilt is advantageously prevented and the valve 50 is less likely to jam or fail, resulting in improved safety and advantageously reducing maintenance costs.

It will, of course, be understood that modifications to the presently preferred embodiment will be apparent to those skilled in the art. Consequently, the scope of the present invention should not be limited by the particular embodiment discussed above, but should be defined only by the claims set forth below and equivalents thereof.

I claim:

1. A gate valve comprising:
    a valve body having an interior surface defining an interior chamber with an upstream opening, a downstream opening and an internal passage therebetween;
    an upstream valve seat mounted to the valve body and defining an opening in the passage between the upstream opening and the downstream opening;
    a downstream valve seat mounted to the valve body and defining an opening in the passage between the upstream opening and the downstream opening;
    a guide rail mounted to the valve body between the upstream valve seat and the downstream valve seat; and
    a first gate and a second gate each having a sealing surface, the gates mounted movably within the interior chamber of the valve body with their sealing surfaces in parallel, each gate movable between an open position wherein fluid communicates between the upstream opening and the downstream opening, and a closed position wherein the sealing surface of each gate is positioned adjacent the opening of its respective valve seat to prevent fluid communication between the upstream opening and the downstream opening of the passage,
    wherein the first gate is located longitudinally between the upstream valve seat and the guide rail and guided by at least one of the upstream valve seat and the guide rail as the first gate moves between the open and closed positions, and
    the second gate is located longitudinally between the guide rail and the downstream valve seat and guided by at least one of the downstream valve seat and the guide rail as the second gate moves between the open and closed positions.

2. A gate valve according to claim 1, further comprising a valve stem, a spring, and a tubular bushing located between the gates, the spring sized to fit within the tubular bushing to bias the gates away from each other, the stem defining a hole to accept the bushing therein.

3. A gate valve according to claim 2, wherein the gates each have cup like indentations located in opposed alignment for accepting the tubular bushing therein.

4. A gate valve according to claim 1, wherein the first gate has a relief canal extending through the gate to allow fluid communication between the upstream opening and the interior chamber of the valve.

5. A gate valve according to claim 1, wherein each of the gates has a rear surface for contacting the guide rail, the rear surface of each gate opposed to the sealing surface of the gate, the rear surfaces of the gates facing each other and aligned in a generally parallel relationship.

6. A gate valve according to claim 5, wherein the rear surface of each gate is generally parallel to the sealing surface of that gate.

7. A gate valve according to claim 5, wherein the rear surface of each gate extends upwardly adjacent to the guide rail.

8. A gate valve according to claim 1, wherein at least one of the gates is mounted for planar contact with the guide rail.

9. A gate valve according to claim 1, wherein the guide rail has a generally T-shaped cross section.

10. A gate valve comprising:
    a valve body having an interior surface defining an interior chamber with an upstream opening and a downstream opening and a passage having a longitudinal axis therebetween for allowing fluid communication;
    an upstream valve seat mounted to the valve body and defining an opening in the passage between the upstream opening and the downstream opening;
    a downstream valve seat mounted to the valve body and defining an opening in the passage between the upstream opening and the downstream opening;
    two opposed, aligned guide rails mounted on the interior surface of the valve body between the upstream valve seat and the downstream valve seat, the guide rails longitudinally spaced apart from the upstream valve seat and the downstream valve seat; and
    an upstream gate associated with the upstream valve seat and a downstream gate associated with the downstream valve seat, each gate having a sealing surface and mounted within the interior chamber of the valve body with its sealing surface in parallel to the sealing surface of the other gate, each gate movable between an open position wherein fluid communicates between the upstream opening and the downstream opening, and a closed position wherein the sealing surface of that gate blocks the opening in its associated valve seat to prevent fluid communication between the upstream opening and the downstream opening of the passage, wherein the upstream gate is sized to slidably fit between the upstream valve seat and the guide rails to be guided by at least one of the upstream valve seat and the guide rails as the gate upstream moves between the open and closed positions, and the downstream gate is sized to slidably fit between the guide rails and the downstream valve seat to be guided by at least one of the downstream valve seat and the guide rails as the downstream moves between the open and closed positions.

11. A gate valve according to claim 10, further comprising a valve stem, a spring, and a tubular bushing located between the gates, the spring sized to fit within the tubular bushing to bias the gates away from each other, the stem defining a hole to accept the bushing therein.

12. A gate valve according to claim 11, wherein the gates each have cup like indentations located in opposed alignment for accepting the tubular bushing therein.

13. A gate valve according to claim 10, wherein the upstream gate has a relief canal extending through the gate to allow fluid communication between the upstream opening and the interior chamber of the valve.

14. A gate valve according to claim 10, wherein each of the gates has a rear surface for contacting the guide rail, the rear surface of each gate opposed to the sealing surface of the gate, the rear surfaces of the gates facing each other and aligned in a generally parallel relationship.

15. A gate valve according to claim 9, wherein at least one of the gates is mounted for planar contact with the guide rail.

16. A gate valve according to claim 14, wherein the rear surface of each gate is generally parallel to the sealing surface of that gate.

17. A gate valve according to claim 14, wherein the rear surface of each gate extends upwardly adjacent to the guide rail.

18. A gate valve according to claim 10, wherein each guide rail has a generally T-shaped cross section.

19. A gate valve comprising:

a valve body having an interior surface defining an interior chamber having a first portion and a second portion, the first portion having an upstream opening and a downstream opening and an internal passage allowing fluid communication therebetween, the second portion of the interior chamber extending radially outwardly from the passage at a predetermined location between the upstream opening and the downstream opening;

an upstream valve seat having a flat generally circular face with a circular opening therein, and two arms extending outward from the circular face, the upstream valve seat mounted to the valve body with the circular opening positioned within the passage and the arms extending into the second portion of the valve body internal chamber;

a downstream valve seat having a flat generally circular face with a circular opening therein and two arms extending outward from the circular face, the downstream valve seat mounted to the valve body with the circular opening positioned within the passage and the arms extending into the second portion of the valve body interior chamber;

two elongated guide rails mounted to the interior surface of the valve body in an opposed, facing relationship, each guide rail located between the upstream valve seat and the downstream valve seat, each guide rail longitudinally spaced apart from the upstream valve seat and the downstream valve seat and extending generally parallel thereto from the first portion to the second portion of the internal chamber;

an upstream gate associated with the upstream valve seat and a downstream gate associated with the downstream valve seat, each gate having a generally circular sealing surface on one side and a depression on the other side, each gate mounted within the interior chamber of the valve body with its sealing surface in parallel to the sealing surface of the other gates, each gate movable between an open position where at least a portion of the face is separated from the associated valve seat to allow fluid flow between the upstream opening and the downstream opening, and a closed position in which the sealing surface of each gate engages the face of its associated valve seat to prevent such fluid flow, the upstream gate mounted with its sealing surface toward the upstream valve seat and slidably sized to fit longitudinally between the upstream valve seat and the guide rails to be guided by planar contact with at least one of the upstream valve seat and the guide rails as it slides between the open and closed positions, the first gate further including a relief canal extending through the first gate to allow fluid communication between the upstream opening and the interior chamber of the valve, and the downstream gate mounted with its sealing surface toward the downstream valve seat and sized to slidably fit longitudinally between the guide rails and the downstream valve seat to be guided by planar contact with at least one of the downstream valve seat and the guide rails as it moves between the open and closed positions;

a cylindrical tubular bushing mounted longitudinally between the depressions in each gate;

a spring sized to fit within the tubular bushing to bias the gates away from each other; and an elongated stem mounted within the interior chamber of the valve body, the elongated stem having a first end and a second end with a flat rectangular portion and a hole therein, the rectangular portion sized to fit longitudinally between the first and second gates and radially between the opposing guide rails, the hole sized to accept the tubular bushing therein for the movement of both gates.

* * * * *